(12) United States Patent
Kollmann

(10) Patent No.: US 11,482,083 B2
(45) Date of Patent: Oct. 25, 2022

(54) QUICK-CHANGE DEVICE HAVING AN ELECTRICAL LOCK STATUS INDICATOR

(71) Applicant: OilQuick Deutschland KG, Steindorf (DE)

(72) Inventor: Michael Kollmann, Egling an der Paar (DE)

(73) Assignee: OilQuick Deutschland KG, Steindorf (DE)

( * ) Notice: Subject to any disclaimer, the term of this patent is extended or adjusted under 35 U.S.C. 154(b) by 38 days.

(21) Appl. No.: 16/925,553

(22) Filed: Jul. 10, 2020

(65) Prior Publication Data
US 2021/0010242 A1    Jan. 14, 2021

(30) Foreign Application Priority Data

Jul. 12, 2019   (DE) .................. 10 2019 118 913.6

(51) Int. Cl.
*G08B 5/22*    (2006.01)
*B60Q 5/00*    (2006.01)
(Continued)

(52) U.S. Cl.
CPC .............. *G08B 5/22* (2013.01); *B60Q 5/005* (2013.01); *B60Q 9/00* (2013.01); *E02F 3/3622* (2013.01); *E02F 3/963* (2013.01); *E02F 9/26* (2013.01)

(58) Field of Classification Search
CPC ......... E02F 9/26; E02F 3/3622; E02F 3/3627; E02F 3/3659; E02F 3/3663; E02F 3/963;
(Continued)

(56) References Cited

U.S. PATENT DOCUMENTS 9,574,319 B2    2/2017  Seljestad
2011/0313625 A1*  12/2011  Miller .................. E02F 3/3663
                                                                    701/50
(Continued)

FOREIGN PATENT DOCUMENTS

AU    2016/236860 A1   10/2017
DE   20 2006 018 263 U1   2/2007
(Continued)

OTHER PUBLICATIONS

Result of Examination report dated Apr. 29, 2020 for German Patent Application No. 10 2019 118913.6.

*Primary Examiner* — Omer S Khan
(74) *Attorney, Agent, or Firm* — Paul D. Bianco; Katharine Davis Wong; Fleit Intellectual Property Law

(57) ABSTRACT

A quick-change device for automatically changing an attachment on a construction machine includes first receptacles disposed on one side of a support for receiving a first coupling element; second receptacles disposed on the other side of the support for receiving a second coupling element, with the second receptacles having at least one locking element which moves between a release position for coupling or uncoupling the attachment and a locked position for holding the attachment in place on the quick-change device; and a display device disposed on the support for monitoring the lock status. The display device includes an electrical lock status indicator and an electrical control unit which activates the lock status indicator in an extended locked position of the locking element and deactivates it in a retracted release position and an extended position of the locking element different from the locked position.

12 Claims, 4 Drawing Sheets

(51) Int. Cl.
*B60Q 9/00* (2006.01)
*E02F 3/36* (2006.01)
*E02F 3/96* (2006.01)
*E02F 9/26* (2006.01)

(58) Field of Classification Search
CPC .. E02F 9/24; B60Q 5/005; B60Q 9/00; G08B 5/22; F16C 11/0647; F16C 11/0604; F16C 11/086; B60G 7/005; B60G 2206/1112
See application file for complete search history.

(56) References Cited

U.S. PATENT DOCUMENTS

| | | | | |
|---|---|---|---|---|
| 2012/0178509 | A1* | 7/2012 | Eggenhaus | A01D 41/1243 460/112 |
| 2012/0252628 | A1* | 10/2012 | Tsutsumi | B60T 1/005 477/19 |
| 2016/0040387 | A1* | 2/2016 | Seljestad | E02F 3/364 403/14 |

FOREIGN PATENT DOCUMENTS

| | | |
|---|---|---|
| DE | 10 2010 016 492 A1 | 10/2011 |
| DE | 10 2015 009 491 A1 | 2/2016 |
| WO | 2004/072387 A1 | 8/2004 |
| WO | 2014/058380 A1 | 4/2014 |
| WO | 2014/0168540 A1 | 10/2014 |
| WO | 2016/153360 A1 | 9/2016 |

\* cited by examiner

QUICK-CHANGE DEVICE HAVING AN ELECTRICAL LOCK STATUS INDICATOR

FIELD OF THE DISCLOSURE

The present disclosure relates to a quick-change device. The disclosure also relates to the use of a display device for this type of quick-change device.

BACKGROUND

Quick-change devices of this type are used to change different attachments on construction machines easily and conveniently. Using this type of quick-change device allows, e.g., swivel buckets, claws, shears, compactors, magnets, hydraulic hammers, or other attachments to be coupled to and uncoupled from, e.g., a boom of an excavator, within a few seconds and at a high safety standard from an operator's cab.

DE 10 2015 009 491 A1 discloses a generic quick-change device. This quick-change device comprises a support which, arranged on one side, has first receptacles for holding a first coupling element disposed on an attachment and, arranged on the other side, second receptacles with a locking element for releasably holding a second coupling element, which locking element moves between a release position and a locked position. Also disposed on the support is a mechanical display device for monitoring the lock status.

SUMMARY

One aspect of the disclosure relates to a quick-change device of the type mentioned above and a display device for use with such a quick-change device, which make it possible to better monitor a correct lock status.

Convenient embodiments and additional advantageous advanced modifications are also disclosed herein.

On the quick-change device according to the present disclosure, the display device comprises an electrical lock status indicator and an electrical control unit which, in an extended locked position of the locking element, activates the lock status indicator and, in a retracted release position and an extended position of the locking element different from the locked position, deactivates the electrical lock status indicator. This means that a correct lock status is indicated only if also the second coupling element has its position designated to indicate a correct lock status. Thus, monitoring and indicating a correct lock status involves not only the position of the locking element but also the position of the second coupling element. As a result, the monitoring function can be improved, and safety can be increased.

Activation of the electrical lock status indicator means that the lock status indicator emits a specific signal. Deactivation of the electrical lock status indicator means that this specific signal is not emitted. Within the meaning of this document, if a signal different from the specific signal is emitted, the electrical lock status indicator is also deactivated.

In an advantageous embodiment, the electrical control unit can be a switch which is controlled by the movement of the locking element and which comprises a first switching element dedicated to the locking element and a second switching element dedicated to the lock status indicator/display device for controlling the lock status indicator.

The switch can favorably be an electromechanical switch, e.g., in the form of a button. The button can be, for example, a roller button or a slider button. A roller button is wear-resistant; however, compared to a slider button, its manufacture entails a greater degree of complexity. A roller button is a rotatably mounted button element, e.g., in the form of a pivotably mounted roller, which rolls on a guide track. A slider button is an element which is not pivotably mounted and which slides or glides on a guide track.

In another advantageous embodiment, only a single switch is provided. Compared to a multi-switch system, a mono-switch system is simpler and less expensive. However, an embodiment in the form of a redundant system is conceivable and possible as well.

Different switching configurations are also possible. Thus, e.g., non-contact switches, e.g., electrical and/or magnetic proximity switches or the like, can also be used.

In a possible embodiment, the first switching element can have at least one cam which interacts with a second switching element. This cam makes it easy to code the position and status information of the locking element. This information can be picked up by the second switching element. The cam can be part of a guide track. A cam can be configured positively in the form of an elevation or negatively in the form of a depression in a guide track, having a positive or negative height, respectively.

Provision can be made for monitoring other statuses of the locking element, for example, specific intermediate positions of the locking element. To this end, if a sensor in the form of a button member is used, it is easy to add additional cams to the guide track.

The cam can especially be a rotary cam, an axial cam, or a linear cam. Thus, different geometrically convenient configurations can be created. The cam or, more specifically, the guide track of a rotary cam is disposed on the circumference of a rotation-symmetrical part which rotates about its symmetrical axis. The cam or, more specifically, the guide track of an axial cam is disposed axially on the front face of a part which rotates about an axis of rotation.

The cam or, more specifically, the guide track of a linear cam is disposed along a part, e.g., a bar-shaped part, which moves in a straight line.

In one embodiment, the guide track can comprise a plurality of cams. The cams can be of the same height or of different heights. Thus, more information about a position and/or status of the locking element can be given.

The second switching element can be mechanically connected to the locking element by means of a linkage system, in particular a rigid linkage system. Such a system facilitates a simple and robust implementation of the display device.

The electrical lock status indicator preferably comprises an optical and/or an acoustic signal generator.

Optoelectrical (in short: optical) and acoustoelectric (in short: acoustic) signal generators have the advantage of low reactance over mechanical indicator devices and can be controlled in fractions of a second. Thus, even complex signal patterns are possible. It is possible, e.g., to adjust or to change not only the signal amplitude (wavelength and sound amplitude) but also the rhythm of the signal generation. A combination of optical and acoustic signal generators is possible as well.

An acoustic signaling device can be, for example, a buzzer, a siren, or a loudspeaker. Acoustic signaling devices have the advantage that no visual contact between the signal generator and the signal recipient is necessary. In addition, different positions or statuses of the locking element can be coded with different acoustic signals so that, for example, during the coupling procedure, a continuous, subtle buzzing sound is emitted, and after the coupling procedure is completed, a short acknowledge sound is emitted.

The optical signal generator of the electrical lock status indicator is favorably a light emitting device which emits diffuse or concentrated light. The light emitting device can, e.g., be an LED or a laser. Optical signal generators have the advantage that they can be configured to radiate light only in one direction or in a plurality of directions. This has the advantage that other persons who are present in the danger zone of a construction machine can also be informed about the coupling statuses of a quick-change device. Light emitting devices have the advantage that they are also visible at night. Depending on the requirements, one light emitting device or a plurality of light emitting devices can be provided. A light emitting device can be configured to emit a single solid color or multiple colors. A light emitting device can also be configured to emit light at specific intervals.

In an advantageous embodiment, the electrical lock status indicator and the electrical control unit can be accommodated in a shared enclosure. This ensures better protection of the electrical components of the display device against the effects of weather. In addition, it is easy to mount a display device on a quick-change device and, in particular, it is also easy to retrofit already operative quick-change devices with a display device.

In an advantageous embodiment of the present disclosure, the enclosure can be transparent or semitransparent. In that case, especially signal generators in the form of light emitting devices can be mounted inside the enclosure. The advantage of this type of design is that a semitransparent enclosure can act as a light diffusor so that semitransparent parts of the enclosure emit light when they are illuminated by a light emitting device. This makes it possible to implement large-surface illuminated displays, which increases the visibility. An illuminated display can emit a single solid color or multiple colors. An illuminated display can comprise a plurality of light emitting devices which emit a single solid color or multiple colors. Furthermore, the enclosure can also have reflecting surfaces. Such surfaces make it possible to amplify or even bundle light signals. Specific positions or statuses of the locking element and thus specific coupling statuses can be coded by a specific choice of colors for the illuminated display. For example, slow flashing of the signal generator in one color can signify the release position of the locking element, rapid flashing in another color can signify a position of the locking element different from the release position and from the locked position. It is, however, also possible to use only a single signal which merely indicates a correct coupling status in an extended locked position of the locking element.

In yet another advantageous embodiment, the display device can have a connector for connecting an external display. An external display can be, for example, a screen in an operator's cab of a construction machine. Such a connector offers the possibility of creating redundant display devices.

The present disclosure also relates to the use of a display device for a quick-change device as described above. The display device is marked by the above-described special characteristics and features.

BRIEF DESCRIPTION OF THE DRAWINGS

Additional characteristic features and advantages of the disclosure follow from the description of a preferred illustrative embodiment below with reference to the drawings. The drawings show.

DETAILED DESCRIPTION

Figure 1A:
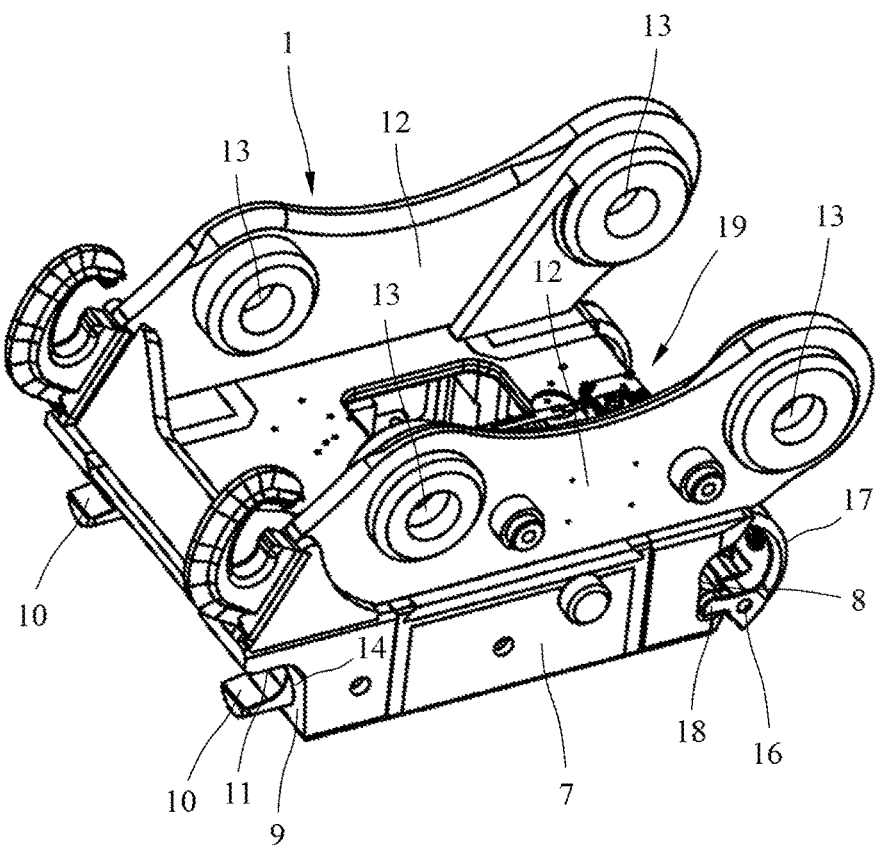
FIG. 1A a quick-change device in a first perspective view.
Figure 1B:
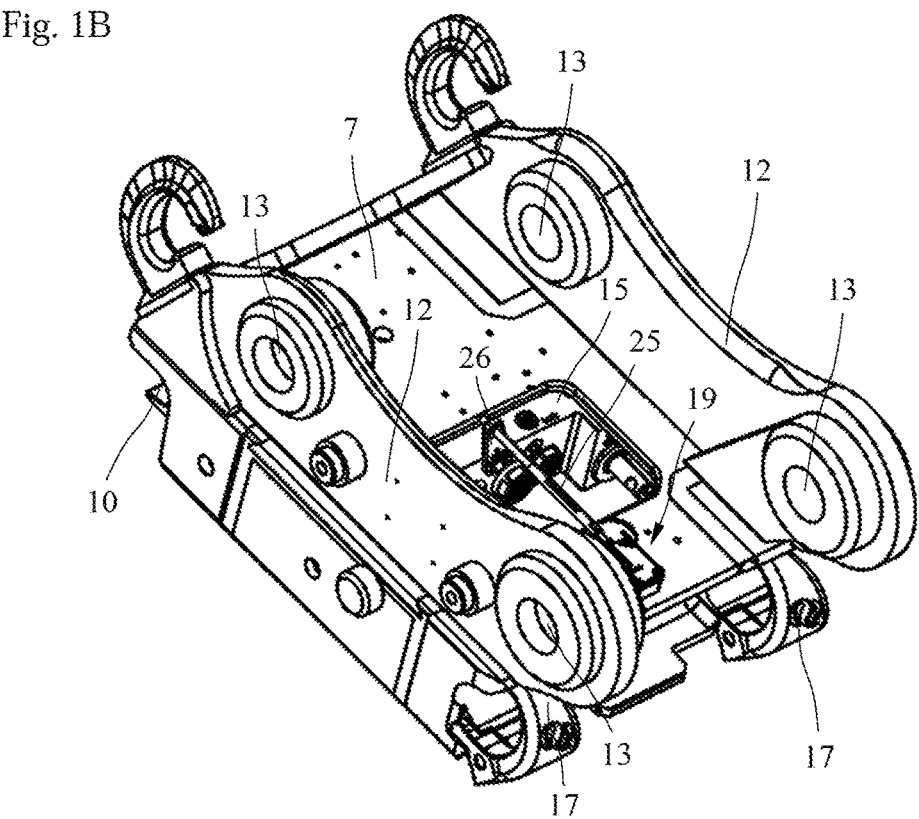
FIG. 1B the quick-change device of FIG. 1A in a second perspective view.

FIGS. 1A and 1B show a quick-change device 1 for changing different attachments on construction machines, in particular excavators, easily and conveniently. This type of quick-change device allows, e.g., swivel buckets, claws, shears, magnets, compactors, hydraulic hammers, or other mechanical and/or hydraulic attachments to be easily and conveniently coupled to and uncoupled from a boom or another attachment part of an excavator or another construction vehicle, e.g., using an adapter 2 as shown in FIG. 2.

Figure 2:
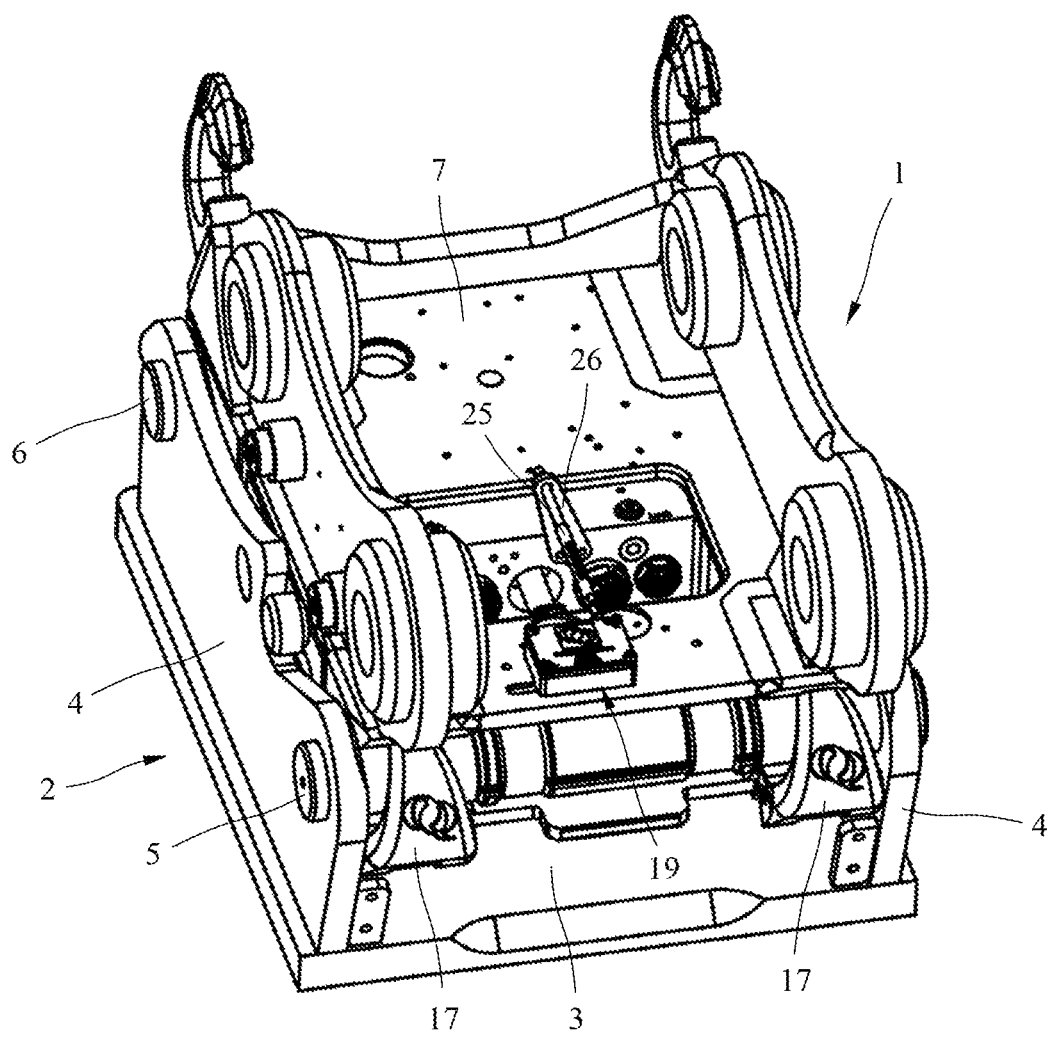
FIG. 2 a quick-change system comprising a quick-change device as in shown in FIGS. 1A and 1B and an adapter.

As shown in FIG. 2, the adapter 2, which can be mounted on an attachment, comprises a base plate 3 and two lateral flanks 4 disposed parallel to each other, between which lateral flanks a first bolt-shaped element 5 and, at a predetermined distance therefrom, a second bolt-shaped coupling element 6 for the detachable connection to the quick-change device 1 are disposed. The two bolt-shaped coupling elements 5 and 6 can be inserted into and held in place in complementary bores in the lateral flanks 4. However, the bolt-shaped coupling elements 5 and 6 can also be disposed directly on the attachment.

The quick-change device 1 shown from different perspectives in FIGS. 1A and 1B comprises a support 7 in the form of a welded or cast part which, on one side, has forwardly open first receptacles 8 for receiving and holding in place the first bolt-shaped coupling element 5 and, on the other side, downwardly open second receptacles 9 with a locking element 10 for receiving and holding in place the second bolt-shaped coupling element 6.

In the illustrative embodiment shown, the quick-change device 1 has two spaced-apart receptacles 8 for the first coupling element 5 on one side of the support 7 and two receptacles 9 for the second coupling element 6 on the other side. The forwardly open first receptacles 8 are configured in the shape of claws or forks. The downwardly open second receptacles 9 have a curved lower abutment surface 11 for the abutment of the second bolt-shaped coupling element 6. On its top face, the support 7 has two lateral parts 12 disposed parallel to each other, in which patent openings 13 for mounting bolts (not shown in the drawing) for mounting the quick-change device 1 on a boom of an excavator or on a connector part of another construction vehicle are disposed.

In the illustrative embodiment shown, the quick-change device 1 also has two locking elements 10 in the form of locking bolts, which are movably guided in guide bores 14 shown in FIG. 1A inside the support 7 and which can jointly be hydraulically moved through an H-shaped cylinder 15 shown in FIG. 1B between a retracted release position for releasing or connecting an attachment and an extended locked position V. In the locked position V, the downwardly open second receptacles 9 are closed on the bottom face by the locking elements 10 disposed in the guide bores 14 so that the second bolt-shaped coupling element 6 is engaged from below by the locking elements 10.

Figure 3A:
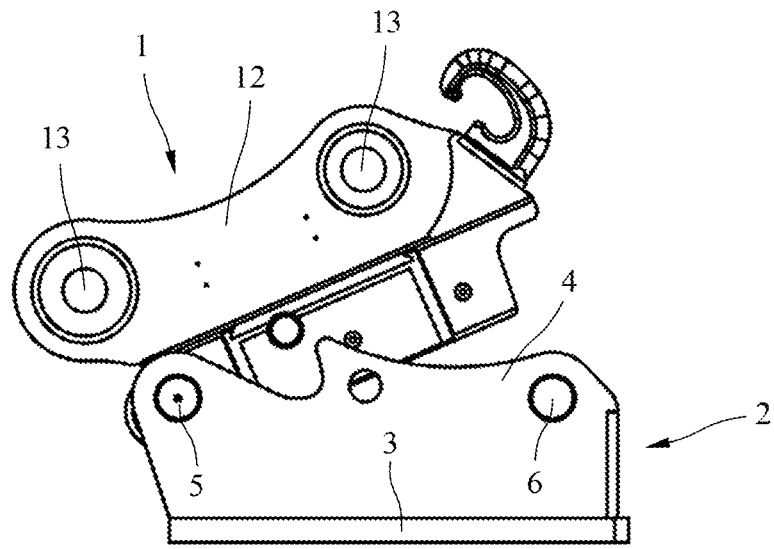
FIG. 3A a quick-change system comprising a quick-change device as shown in FIGS. 1A and 1B and an adapter in a release position.

In addition, also disposed on the receptacles 8 for the first coupling element 5 are capturing hooks 17 which swivel about a transverse shaft 16. These capturing hooks 17 can be swiveled by the coupling elements 5 over a lug 18 between a downwardly swiveled coupling position and an upwardly swiveled closed position To connect an attachment by means of the quick-change device 1, the quick-change device 1, which, as a rule, is disposed on a boom of an excavator, is first moved, as illustrated in FIG. 3A, so that the first coupling element 5, which is disposed, e.g., on the adapter 2 or on the attachment, is retracted into the claw- or fork-shaped receptacles 8 on one side of the quick-change device 1. Once the first coupling element 5 is correctly engaged in the receptacles 8, the capturing hooks 17 as well are moved over the lugs 18 from the downwardly swiveled coupling position into the upwardly swiveled closed position. During the engagement of the first coupling element in the coupling position, the locking elements 10 are in a completely retracted release position L inside the support 7.

Figure 3B:
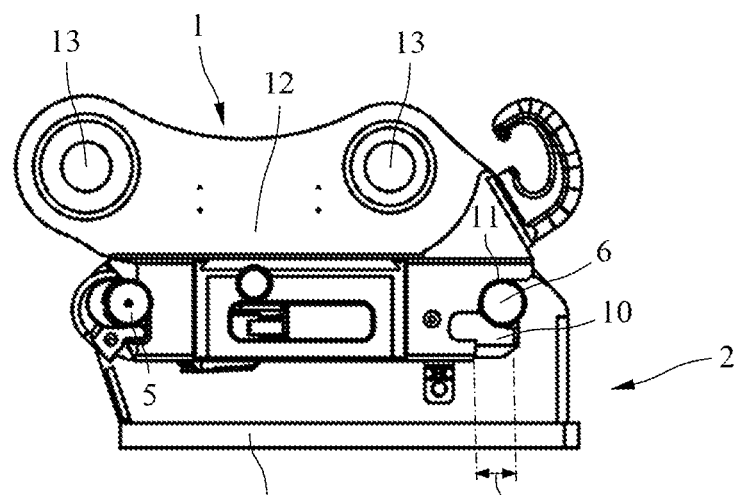
FIG. 3B a quick-change system comprising a quick-change device as shown in FIGS. 1A and 1B and an adapter in a locked position.

The quick-change device 1, with the locking elements 10 still retracted, is then swiveled about the first bolt-shaped coupling element 5 so that the second coupling element 6 on the adapter 2 or attachment comes to abut the abutment surfaces 11 of the downwardly open receptacles 9 on the other side of the quick-change device 1 as illustrated in FIG. 3B. Subsequently, the locking elements 10, which are movably disposed in the guide bores 14 in the support 7 of the quick-change device 1, can be hydraulically extended into a locked position V, as shown in FIG. 3B, so that the second bolt-shaped coupling element 6 is engaged from below by the two locking elements 10 on the quick-change device 1, thereby causing the attachment to be held in place on the quick-change device 1.

Figure 3C:
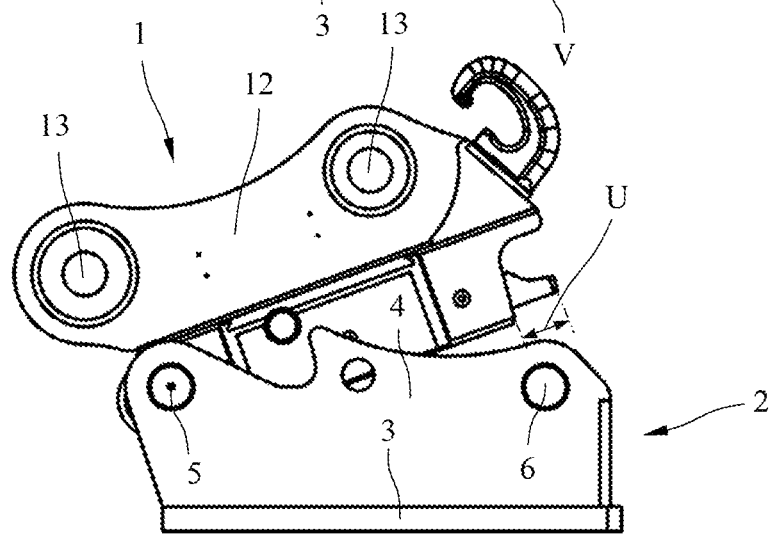
FIG. 3C a quick-change system comprising a quick-change device as shown in FIGS. 1A and 1B and an adapter in an unlocked position.

However, improper operation can lead to coupling malfunctions, thereby causing locking failures. A coupling malfunction occurs, e.g., if the locking elements 11 are extended before the coupling elements 5 are engaged in their correct locked position, i.e., are abutting the lower abutment surface 11 of the support 7. This is the case, e.g., if, due to an operating error or due to dirt build-up between the adapter 2 and the quick-change device 1, the quick-change device 1 is not properly lowered. In this case, the locking elements 10 move in the extended position, however without capturing the coupling elements 5 of the adapter 2 and bracing them against the support 7 of the quick-change device 1. As illustrated in FIG. 3C, the locking elements 10 move above the bolt-shaped coupling elements 5 into the extended position so that no firm connection between the adapter 2 and the quick-change device 1 is established. If the coupling elements 5 are not in their correct position and, as a result thereof, there is no limit stop, the bolt-shaped locking elements 10 move beyond the locked position V shown in FIG. 3B into an unlocked extended position U as shown in FIG. 3C. In spite of the extended locking elements 10, a locking failure has occurred so that, when the quick-change device 1 is lifted, the adapter 2, together with the attachment connected thereto, can slip out of the receptacles 9 and, if need be, will have to be captured by the capturing hooks 17. To monitor a correct lock status, a display device 19, which is coupled to the locking elements 10, is disposed on the support 7 of the quick-change device 1.

Figure 4A:
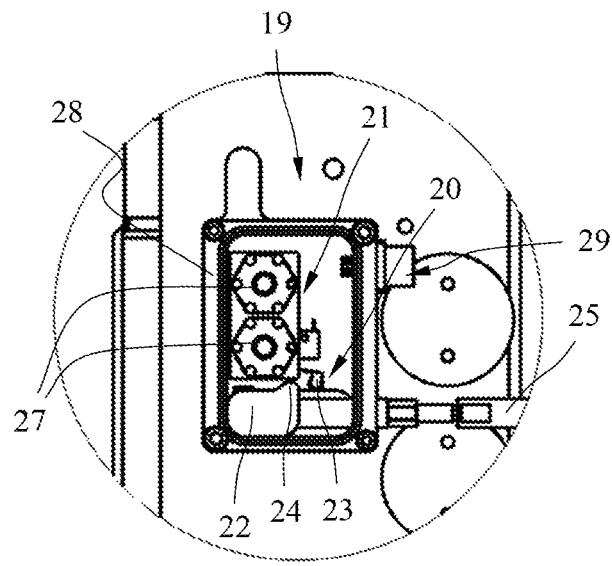
FIG. 4A a display device in a release position.
Figure 4B:
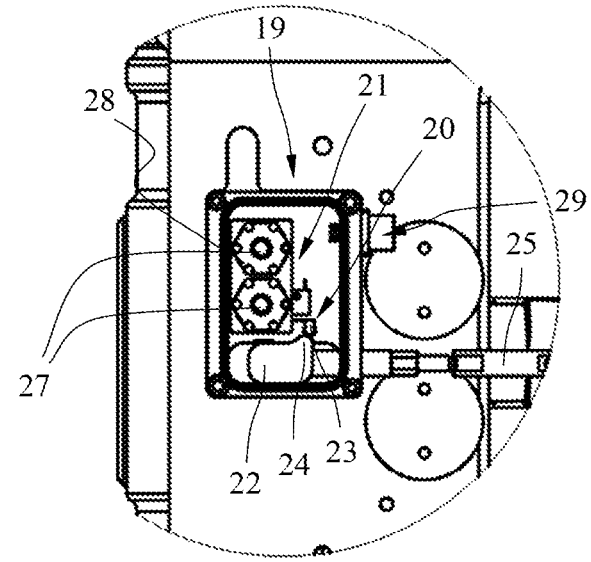
FIG. 4B a display device in a locked position.
Figure 4C:
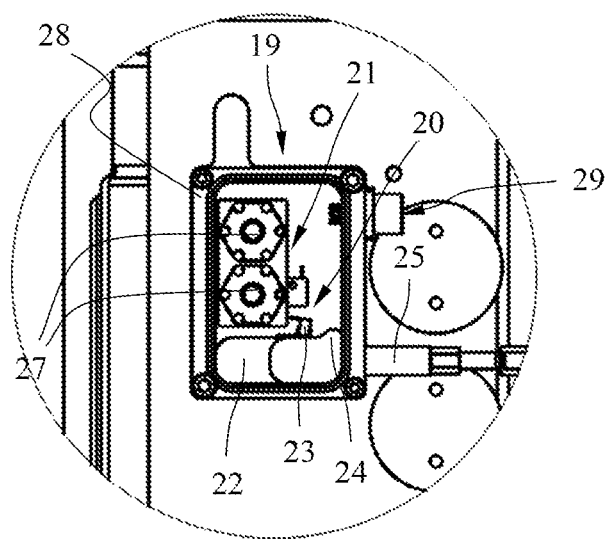
FIG. 4C a display device in an unlocked extended position.

As illustrated in FIGS. 4A to 4C, the display device 19 comprises an electrical control unit 21 for monitoring a correct lock status or, more specifically, a correct position of the locking element 10, which element moves between a retracted release position, an extended locked position V and an unlocked extended position U different from the locked position, and an electrical lock status indicator 20, which is connected to the control unit 21, for indicating at least one correct locked position V by means of a first signal and for indicating an unlocked extended position U different from the correct locked position V and/or a retracted release position of the locking element 10 by means of a second signal. In the illustrative embodiment shown, the second signal only serves to deactivate the first signal.

In the illustrative embodiment shown, the electrical control unit 21 for controlling the signal generator 27 is implemented in the form of a switch having a first switching element 22 dedicated to the locking element 10 and a second switching element 23 dedicated to the lock status indicator 20, which switch is activated by the movement of the locking element 10. The second switching element 23 is implemented in the form of an axially movable button which is activated by the first switching element 22. The button is a roller button. The first switching element 22 is implemented in the form of a cam slide (linear cam) with a cam 24 which interacts with the second switching element 23. However, the electrical control unit 21 can also be a non-contact switch, e.g., an inductive proximity sensor or the like.

In the illustrative embodiment shown, the cam slide comprises a guide track with only a single cam 24, with the cam or, more specifically, the position of the cam coding a correct locked position V of the locking element 10. In this example, the cam is implemented in the form a sinus-shaped elevation having a specific height. The first switching element 22, here in the form of a cam slide with the cam 24, is connected by means of a rigid linkage system 25 shown in FIG. 2 and a holding fixture 26 to the cylinder 15 which serves to move the locking elements 10. When the cylinder 15 moves the locking elements 10 into the positions shown in FIGS. 3A to 3C, the linkage system 25 moves the first switching element 22, which is implemented in the form of a cam slide with the cam 24, into the positions shown in FIGS. 4A to 4C.

The electrical control unit 21 is configured in such a way that the electrical lock status indicator 20, which comprises the signal generators, is activated only if the locking elements 10 are in the locked position V shown in FIG. 3B.

In the illustrative embodiment shown, the signal generators of the electrical lock status indicator 20, which are controlled by the electrical control unit 21, are implemented in the form of optical signal generators 27 with two light emitting devices, here in the form of light emitting diodes. Using two separate light emitting devices can improve the visibility of the illuminated display. In lieu of, or in addition to, the light emitting elements, the electrical lock status indicator can also have acoustic signal generators, e.g., a loudspeaker.

In the locked position V, the lock status indicator 20 is activated in the form of the light emitting devices, i.e., the control unit 21, here in the form of the second switching element 22, closes an electrical circuit for operating the light emitting devices. The second switching element functions as an analog switch or is connected to such a switch so that the second switching element 23, which is deflected by the cam 24, directly controls the electrical lock status indicator. However, to indirectly close the electrical circuit, it may also be possible to dispose an electrical processing unit upstream or downstream of the second switching element 23. The electrical circuit can be an electrical circuit which is part of the power supply system of the construction machine. However, it is also conceivable and possible for the electrical display device 19 to be independently supplied with power, e.g., by a rechargeable battery element. Such a battery element could be located, e.g., inside the enclosure 28. As soon as the locking element 10 moves out of the locked position V, the deflection of the roller button returns to the baseline of the cam slide and interrupts the power supply to the light emitting devices, thereby deactivating the electrical lock status indicator.

In other embodiments not shown in the drawings, the cam slide has a plurality of cams 24 of different heights, which cams code different positions and/or statuses of the locking elements 10.

To protect against dirt, damage and the effects of weather, the electrical lock status indicator 20 and the electrical control unit 21 is accommodated in a shared enclosure 28. On its top side, the enclosure, here in the shape of a rectangle, has a transparent cover plate. However, the enclosure may also have transparent elements on other sides or may be overall completely transparent. Other shapes of enclosures not shown in the illustrative embodiment are possible, especially circular, semicircular, or dome-like enclosure shapes. The shape design used can favorably improve the visibility from a plurality of different angles. In yet another embodiment, the enclosure can also be partially or completely semitransparent. In this case, glare is reduced, and the light emitting surface is enlarged.

Disposed on the enclosure 28 is a connector 29 for a connection to external displays or the like. Via the connector, signals can be picked off the display device and, e.g., be transmitted for output on an external screen located in the operator's cab of a construction machine.

LIST OF REFERENCE CHARACTERS

1 Quick-change device
2 Adapter
3 Base plate
4 Lateral flank
5 First coupling element
6 Second coupling element
7 Support
8 First receptacle
9 Second receptacle
10 Locking element
11 Abutment surface
12 Lateral part
13 Opening
14 Guide bore
15 Cylinder
16 Transverse shaft
17 Capturing hook
18 Lug
19 Display device
20 Electrical lock status indicator
21 Electrical control unit
22 First switching element
23 Second switching element
24 Cam
25 Linkage system
26 Holding fixture
27 Signal generator
28 Enclosure
29 Connector

The invention claimed is:

1. A method for monitoring lock status of a quick-change device during connection of an attachment to a construction machine, the method comprising:
   providing a quick-change device including:
   first receptacles disposed on a first side of a support part, the first receptacles configured for receiving and holding a first coupling element disposed on an adapter part or on the attachment;
   second receptacles on disposed on a second side of the support part, the second receptacles configured for receiving and holding a second coupling element disposed on an adapter part or on the attachment;
   at least one locking element movably disposed in the support part, the at least one locking element movable between a retracted release position for coupling or uncoupling the attachment, an extended locked position for holding the attachment in place on the quick-change device, and an extended unlocked position for indicating coupling malfunction; and
   a display device disposed on the support part having an electrical lock status indicator and an electrical control unit, the display device configured for monitoring lock status;
   wherein the electrical control unit activates the electrical lock status indicator only when the at least one locking element is in the extended locked position and the second receptacles are engaged with the second coupling element and the electrical control unit deactivates the electrical lock status indicator when the at least one locking element is in the retracted release position and the first receptacles are engaged with the first coupling element or the at least one locking element is in the extended unlocked position;
   checking the display device for a deactivated lock status to confirm that the at least one locking element is in a retracted release position for coupling the attachment;
   engaging the first coupling elements with the first receptacles;
   checking the display device for the deactivated lock status to confirm that the at least one locking element remains in the retracted release position;
   engaging the second coupling elements with the second receptacles; and
   checking the display device for the lock status to confirm correct coupling status of the attachment,
   wherein, if the at least one locking element is in an extended locked position, the electrical lock status indicator is electrically activated indicating that the quick-change device is in the correct coupling status or if the at least one locking element is in an extended unlocked position, the electrical lock status indicator is not electrically activated indicating a coupling malfunction.

2. The method of claim 1, wherein monitoring the lock status of the quick-change device includes monitoring both a position of the at least one locking element and a position of the second coupling elements during the connection of the attachment to the construction machine.

3. A quick-change device configured for changing an attachment on a construction machine, the quick-change device comprising:

first receptacles disposed on a first side of a support part, the first receptacles configured for receiving and holding a first coupling element disposed on an adapter part or on the attachment;

second receptacles on disposed on a second side of the support part, the second receptacles configured for receiving and holding a second coupling element disposed on an adapter part or on the attachment;

at least one locking element movably disposed in the support part, the at least one locking element movable between a retracted release position for coupling or uncoupling the attachment, an extended locked position for holding the attachment in place on the quick-change device, and an extended unlocked position for indicating coupling malfunction; and a display device disposed on the support part having an electrical lock status indicator and an electrical control unit, the display device configured for monitoring lock status;

wherein the electrical control unit activates the electrical lock status indicator only when the at least one locking element is in the extended locked position and the second receptacles are engaged with the second coupling element and the electrical control unit deactivates the electrical lock status indicator when the at least one locking element is in the retracted release position and the first receptacles are engaged with the first coupling element or the at least one locking element is in the extended unlocked position.

4. The quick-change device of claim 3, wherein the electrical control unit is a switch activatable by movement of the at least one locking element, the switch having a first switching element for the at least one locking element and a second switching element for the electrical lock status indicator.

5. The quick-change device of claim 4, wherein the second switching element is a button activatable by the first switching element.

6. The quick-change device of claim 4, wherein the first switching element comprises at least one cam configured for interacting with the second switching element.

7. The quick-change device of claim 4, wherein the second switching element is mechanically connected to the at one least one locking element by a linkage system.

8. The quick-change device of claim 4, wherein the electrical lock status indicator comprises at least one of an optical and an acoustic signal generator.

9. The quick-change device of claim 8, wherein the optical signal generator is a light emitting device.

10. The quick-change device of claim 3, further comprising an enclosure configured for enclosing the electrical lock status indicator and the electrical control unit.

11. The quick-change device of claim 10, wherein the enclosure is transparent or semitransparent.

12. The quick-change device of claim 3, wherein the display device further comprises a connector for connecting an external display.

* * * * *